Dec. 14, 1965   R. F. PROHL   3,223,958
CLAMP FOR EXTENSION CORDS
Filed Aug. 8, 1962
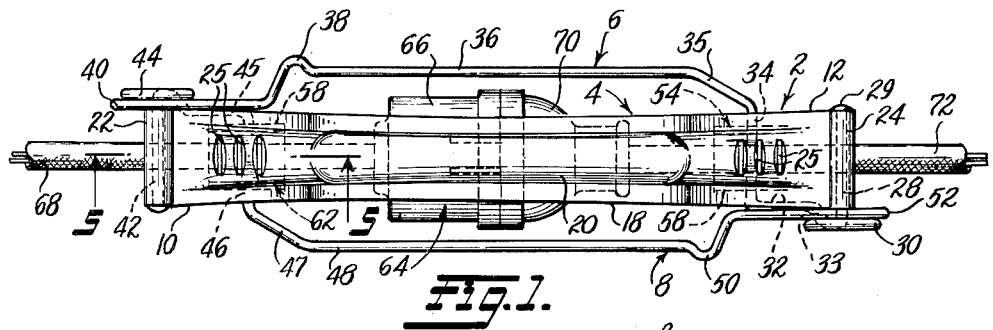
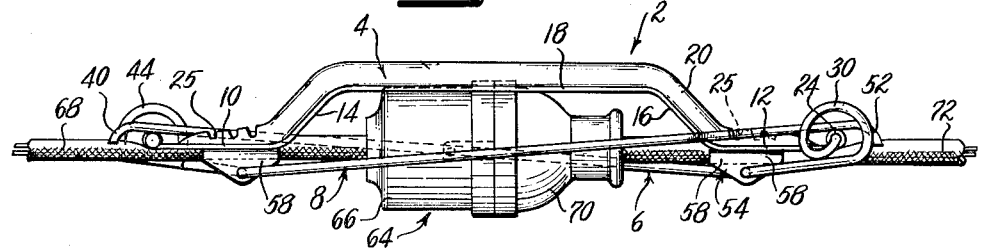
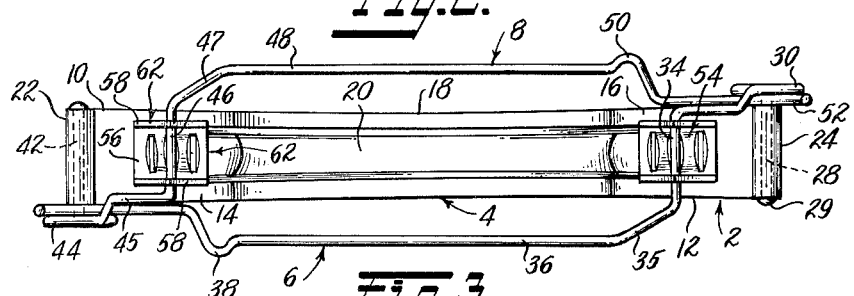
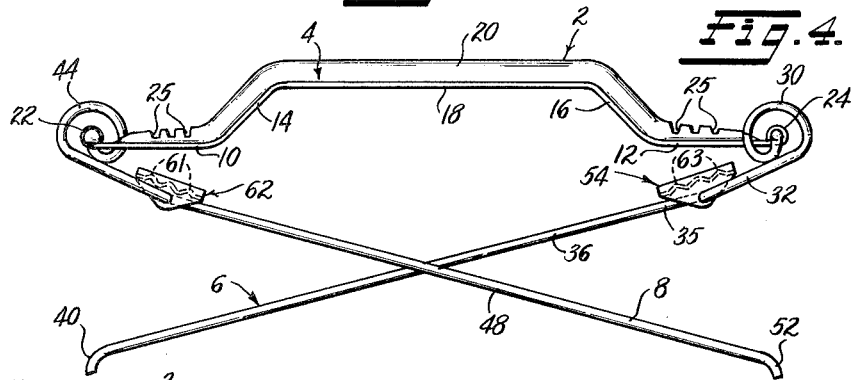
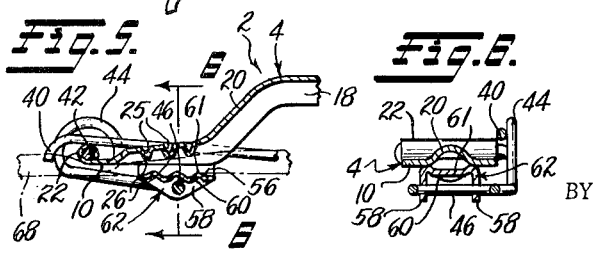
INVENTOR
Robert F. Prohl
BY
Baen & Thomas
ATTORNEYS

//  ...

United States Patent Office 3,223,958
Patented Dec. 14, 1965

3,223,958
CLAMP FOR EXTENSION CORDS
Robert F. Prohl, 4821 Willow Lane, Boise, Idaho
Filed Aug. 8, 1962, Ser. No. 215,688
19 Claims. (Cl. 339—75)

The present invention relates generally to clamps for securing together the ends of extension cords or cables joined by an electrical connector of the plug and socket type, to prevent accidental disconnection of the plug and socket.

More particularly, the invention relates to an improved clamp that is designed so that it is easy to attach to and remove from the connected ends of extension cords, which will serve as a protector for the plug and socket of the electrical connector, and which is sufficiently rugged to withstand severe conditions of use.

Electrical conductors, such as extension cords or extension cables, utilized for transmitting electrical current from an outlet to an appliance, or a motor-driven device located at a distance from the outlet, are normally made in lengths measuring from about ten feet to a hundred or more feet. When the appliance or device requiring electrical energy is at a distance from the outlet greater than the length of one such extension cord, it is common practice to connect together two or more extension cords to make up the required length.

The standard connector utilized for interconnecting two conventional extension cords consists of a socket portion having a pair of slots therein, and a plug portion having a pair of prongs projecting therefrom. The socket portion usually contains a pair of bent resilient metal contact strips, one in alignment with each slot. Each strip is so positioned and shaped that when the prongs on the plug are inserted into the socket each prong will be frictionally engaged by its associated strip. This frictional engagement normally is the only force relied upon to hold the two parts of the electrical connector in assembled relationship, and often proves adequate where the extension cords remain stationary and no axial pulling forces are exerted thereon, as when the electrical device connected with the cord is moved from one location to another in use.

Thus, in many applications of interconnected extension cords in homes, the electrical energy is supplied to a vacuum cleaner, an electric lawn mower, etc.; and at airports, to a starter for an aircraft engine, portable air conditioning equipment, etc. Further, at construction sites it is common practice to connect several extension cables together in order to transmit power to motor driven cement mixers, power tools, and the like. In applications such as these, the pull exerted on the conductors during movement thereof, is often sufficiently great to cause the connector portions to separate; similarly, the connectors are often disconnected when non-electrical equipment is carelessly handled and catches thereon or personnel inadvertently trip thereover. The need for a more secure connection than is obtainable from the normal spring or frictional engagement of a plug and socket connection is thus readily apparent.

A number of devices have been proposed heretofore for securing electrical connectors or extension cords together. One type consists of little more than a closed, resilient loop which is slipped over the two parts of the electrical connector, and which is frictionally retained in position thereon. Because there is no positive clamping action present, this type often becomes displaced in use, or fails under pulling stress. The device of the present invention is positive in action, and firmly clamps the ends of the two extension cords together on opposite sides of the electrical connector, thereby overcoming the deficiencies of the resilient-loop type of connector.

Another common type of device for securing electrical connectors together consists of a clamp having a pair of pliers-like jaws thereon, which are pivotally connected to a frame which itself is permanently or semi-permanently attached to one of the electrical connector halves. While this type of connector clamp normally is positive acting, it cannot be readily attached and removed from the electrical connector, and it often is quite large and heavy. The connector clamp of the subject invention is usable with any plug and socket type electrical connector for extension cords or cable, and is permanently attached thereto. Moreover, it is easily attached and removed, is compact, of lightweight, and can be used with connectors and cords of a wide range of sizes.

More specifically, the clamp of the present invention comprises an elongated sheet metal frame which may be bowed or otherwise shaped to provide a cavity or open space to receive an electrical connector of the plug and socket type. The opposite end portions of the frame have clamping surfaces that are crimped to provide transverse serrations arranged so that, when the clamp is in use, the serrated portions engage the insulation of the extension cords to which the electrical connector is attached. One of a pair of spring arms extends along each side of the frame and is pivotally connected with an end of the frame. Each arm carries a serrated clamping element or jaw which engages the insulation of the extension cords and cooperates with the serrations on the end portions of the frame to provide a positive, non-slip gripping means for holding the extension cords against movement relative to the frame.

Thus, the electrical connector is prevented from being pulled apart. The clamping jaws are preferably pivotally mounted upon the spring arms so that they are self-aligning with the extension cords. One end of each of the spring arms has a shaft portion that serves as its mounting pivot so that the arms extend in opposite directions, one on each side of the frame. Each arm has a coiled portion adjacent one end of its shaft portion lying parallel with the edge of the adjacent end of the frame. The free end of the arms can be readily moved manually into closed, clamping position by placing the same behind the coiled portion at the pivoted end of the other arm. The clamp can readily be removed by reversing the manipulation of the arms and moving them to their open position.

It is an object of this invention, therefore, to provide a clamp for securing together the halves of an electrical connector attached to the ends of extension cords, which clamp is so constructed as to be easily attachable to and readily removable from the extension cords.

Another object is to provide a clamp for extension cords, which positively grips the two cords at spaced points on opposite sides of the electrical connector joining the same to prevent accidental separation of the connector parts.

A further object is to provide a clamp for extension cords which will protect the electrical connector associated therewith from damage from rough handling and the like.

It is also an object to provide a clamp for electrical extension cords, which includes cord-clamping elements that are resiliently urged against the cords to provide a positive clamping action preventing longitudinal movement of the cords relative to the clamping elements, without damage to the cords.

A still further object is to provide an extension cord clamp in which all of the parts remain assembled at all times, and require no adjustment for use with cords or cables of different size.

Still another object is to provide a clamp for extension cords, which can be attached and removed without using any tools.

Still another object is to provide a clamp for extension cords which consists of a minimum number of parts that can be made by stamping and interconnected by heavy spring wire, thus assuring low manufacturing costs.

Other objects and advantages of the invention will be apparent from the following description when considered in connection with the accompanying drawings, wherein:

FIG. 1 is a plan view of a clamp constructed according to the invention, the clamp being shown attached to the ends of two extension cords joined by an electrical connector;

FIG. 2 is a side elevational view of the clamp, connector and extension cords of FIG. 1;

FIG. 3 is a bottom view of the clamp per se as it appears when closed;

FIG. 4 is a side elevational view of the clamp per se with the resilient arms and clamping jaws thereof shown in their open position;

FIG. 5 is a fragmentary sectional view taken on line 5—5 of FIG. 1, showing the manner in which an electric cord or cable is tightly held between the frame and one of the clamping jaws;

FIG. 6 is a sectional view, taken on the line 6—6 in FIG. 5, further showing the manner in which the clamping surfaces are constructed.

Referring now to the drawings, the extension cord clamp is generally identified by the numeral 2 and comprises an elongated sheet metal frame 4 that may be formed readily by a simple stamping operation. A pair of resilient arms 6 and 8 is mounted upon the frame 4 in a manner that will be described later.

The frame 4 comprises a pair of aligned end portions 10 and 12, and reversely bent portions 14 and 16 that secure the end portions to a central portion 18. Thus, the frame has the appearance of being bowed, or of a very shallow U with diverging legs 14 and 16 and laterally extending end portions 10 and 12 projecting from the respective leg portions, as is best shown in FIG. 4. The frame 4 has an arcuate reinforcing rib 20 which extends centrally thereof for nearly the full length of the frame. The opposite ends 10 and 12 of the frame 4 are flat beyond the ends of the rib 20 and their extremities are rolled to form transverse tubular bearings 22 and 24. The opposite ends of the rib 20, in the zone of the end portions 10 and 12, are provided with transverse indentations 25 on the upper side thereof to provide serrations 26 extending inwardly from the lower side thereof (see FIG. 5). These serrated areas provide clamping surfaces to be engaged with the extension cords as will be explained more fully hereinafter.

The spruing arm 6 is formed from heavy, resilient wire, and includes at one end a shaft portion 28 that extends transversely of the frame 4 and is rotatably received within the bearing 24, the extremity of the shaft portion being peened over at 29 to secure the arm 6 to the frame 4. A coil 30 is formed in the arm 6 adjacent the opposite end of the bearing 24 and is connected with a short, longitudinal arm portion 32, which has an offset 33 therein extending toward the frame 4. The coil 30 lies in a plane at right angles to the shaft portion 28 and parallel with the adjacent edge of the frame. The arm 6 also includes a transverse jaw-supporting portion 34 that extends parallel with the shaft portion 28 and transversely from the arm portion 32. A clamping jaw 54 is pivotally mounted on the portion 34. The arm 6 is bent to provide a portion 35 on an angle of about 30° beyond the portion 34 and which merges into a relatively long lever portion 36 that extends generally parallel with the side of the frame 4. The arm portion 36 has a reverse bend 38 formed therein and terminates in a lock portion 40 that is downturned at its extremity.

The resilient arm 8 is identical to the arm 6 and includes a shaft portion 42 received in the bearing 22, a coil spring portion 44, a short arm portion 45, a transverse portion 46 upon which a clamping jaw 62 is mounted, an angular portion 47, a lever arm portion 48, a reverse bend 50 and a locking arm portion 52, having its end downturned.

The clamping jaws 54 and 62 are identical in structure and may be formed as sheet metal stampings. Hence, a description of one clamping jaw will suffice for both. Thus, the clamping jaw 62 includes a body portion 56, FIGS. 5 and 6, having a pair of generally triangular side flanges 58 at its side edges provided with aligned bores for receiving the transverse arm portion 46. The body portion 56 is arcuate in transverse cross section and has indentations 60 on its lower convex side, which form transverse serrations 61 in the concave portion of the body. The clamping jaw 54 is identical to the jaw 62 and includes among other features the transverse serrations 63, FIG. 4. The jaw 54 is retained on the arm 6 on the portion 34 between the short arm portion 32 and the angular portion 35, and the jaw 62 is retained on the arm 8 on the portion 46 between the short arm portion 45 and the angular portion 47.

The transverse arm portions 34 and 46 of the spring arms 6 and 8, respectively, are so positioned relative to their respective shaft portions 28 and 42 that the clamping jaws 54 and 62 are disposed in confronting relation to the serrated frame end portions 10 and 12, respectively, when the spring arms are in their closed position, shown in FIGS. 1 and 2. It will be particularly noted from FIG. 5 that the serrations 26 in the end portion 10 are staggered or off-set relative to the serrations 61 in the clamping element 62, whereby the action of the serrations tends to produce a crimp in the extension cord to provide a firm grip on the cord.

The manner in which the present clamp is used to secure together the ends of two extension cords is shown in FIGS. 1 and 2, wherein an assembled electric connector 64, comprising a socket 66 is connected with an extension cord 68, and a plug 70 is connected with an extension cord 72. In order to mount the clamp 2 on the interconnected extension cords 68 and 72, the spring arms 6 and 8 are placed so that they assume approximately the positions illustrated in FIG. 4, it being understood that the free ends of the arms may be moved farther from the frame 4 than is illustrated, if desired. It will be noted that the clamping jaws 54 and 62 are positioned so that the serrations 61 and 63 thereof are disposed upwardly. The frame 4 is then placed over the extension cords 68 and 72 so that the ends 10 and 12 of the frame engage the cords in longitudinal alignment with the frame 4. It will be noted from FIG. 2 that the frame 4 is shaped so that it easily accommodates the connector 64 and permits the extension cords 70 and 72 to project therefrom in a substantially straight line.

After the frame 4 has been positioned relative to the extension cords 68 and 72, as described above, one of the resilient arms, say the arm 6, is moved toward its closed position relative to the frame. The serrations 63 on the clamping jaw 54 then engage the extension cord 72, and as the arm 6 is swung toward the frame 4 sufficiently to permit the free end or locking portion 40 to be sprung behind the coil 44, the jaw 54 forces the cord into engagement with the serrations 26, so that the cord 72 is tightly clamped between the two sets of serrations 26 and 63.

The clamping jaw 54 is thus continuously urged toward the frame end 12 by the resilient action of the spring arm 6, which fulcrums about the jaw-carrying portion 34. The force thus exerted is sufficient to positively clamp the extension cord 72 against longitudinal movement, without causing damage thereto.

After the spring arm 6 is moved to its closed position, the lever arm 8 is manipulated in a similar manner to engage the clamping jaw 62 with the cord 68. The free end 52 of the arm 8 is sprung to position it behind the coil 30 of the arm 6. Here again, the spring arm 8 fulcrums about its jaw-carrying portion 46.

After the spring arms 6 and 8 have been moved to their closed position, the clamp is completely installed. It will be noted that the installation of the clamp does not require the use of any tools. The clamp can be removed by merely reversing the above-described procedure.

It will be apparent from the foregoing description and from an examination of FIGS. 1 and 2 that the frame 4 and the spring arms 6 and 8 partially encompass the connector 64 so that said connector is protected against damage that might be caused by impact with obstacles. It will also be apparent that when the clamp 2 is in position, the electric cords or cables 68 and 72 are secured against accidental disconnection and that the clamp will remain in position under severe adverse conditions of use. It will also be apparent that in view of the nature of the spring arms 6 and 8, extension cords or cables of different sizes can be positively clamped against the frame by the clamping jaws 54 and 62. It will be further noted that the parts of the present extension cord clamp always remain in assembled relation so that none of the parts can become lost.

It will be apparent that various changes may be made in the design, arrangement and proportions of the parts of the present clamp without departing from the principles of the invention or the scope of the annexed claims.

I claim:

1. A clamp, comprising: an elongated frame having a clamping surface thereon near one end thereof; a resilient arm pivoted at one end thereof to said one end of said frame and having a portion extending along one longitudinal side of said frame and having its other end free to swing about the pivot of said arm; a clamping jaw pivotally mounted upon said arm and located on said arm in a position to confront said clamping surface on said frame; and means carried by the other end of said frame and engageable by the free end of said resilient arm upon flexing of said arm toward said frame about said clamping jaw as a fulcrum for releasably retaining said arm in flexed relationship with said frame, whereby said clamping jaw is continuously urged toward said clamping surface by the inherent resilience of said flexed arm.

2. A clamp, comprising: an elongated frame having a clamping surface thereon near each end thereof; a pair of resilient arms respectively connected at one end thereof to a different end of said frame and extending along opposite sides of said frame and having its other end free to swing about its connected end; a clamping jaw mounted upon each of said resilient arms and located on said arms in a position to confront one of said clamping surfaces on said frame; and means carried by each end of said frame for retaining the free ends of said resilient arms in fixed position relative to said frame, the free end of each arm being engageable with the means on the end of the frame opposite the connected end of said arm.

3. A clamp as defined in claim 2, in which the clamping jaws are pivotally mounted upon the resilient arms.

4. A clamp as defined in claim 2, in which the frame has a transversely extending bearing positioned at each end thereof, and wherein each resilient arm has a transversely extending shaft portion pivotally mounted in one of said bearings.

5. A clamp as defined in claim 4, wherein each of the resilient arms has a portion extending transversely of the frame substantially parallel with and adjacent to its shaft portion, and wherein the clamping jaws are pivotally mounted upon said transverse portions.

6. A clamp as defined in claim 5, in which each clamping jaw includes a body portion and flanges extending along the sides of said body portion having aligned openings for pivotally mounting the same on the transverse portions of said resilient arms.

7. A clamp as defined in claim 2, in which the clamping surfaces near the end portions of the frame have transverse serrations, and wherein the clamping jaws also have transverse serrations.

8. A clamp as defined in claim 7, in which the transverse serrations at the ends of the frame are staggered relative to the transverse serrations in the clamping jaws.

9. A clamp as defined in claim 2, in which the clamping surfaces on the frame and on the clamping jaws are convex, and wherein the convex surfaces confront each other.

10. A clamp as defined in claim 9, in which the convex surfaces have transverse serrations formed thereon.

11. A clamp as defined in claim 2, wherein each resilient arm also has an outwardly projecting portion thereon adjacent the connected end thereof lying in a plane generally parallel to the plane of pivotal movement of said arm, the free end of one arm being engageable behind the projecting portion of the opposite arm for securing said arms in closed position.

12. A clamp for securing together two extension cords joined by a connector, comprising: a frame having clamping surfaces thereon near each end thereof; a pair of resilient arms, each pivoted at one end thereof to a different end of said frame and having its other end free, and lying in a plane generally parallel to said frame, each of said arms having at the pivoted end thereof a portion engageable by the free end of the other arm; and a clamping element mounted upon each of said arms and being movable into a position confronting a clamping surface on said frame, the free end of each arm extending to the pivoted end of the other arm and being releasably engageable with said portion of the other arm to secure the same in closed position.

13. A clamp for securing together two extension cords joined by a connector, comprising: an elongated frame, said frame having a base portion, legs diverging from said base portion and ends generally parallel with said base portion forming continuations of said legs; a pair of resilient arms, each pivoted at one end thereof to a different end of said frame and arranged to have the free end thereof moved in a plane generally parallel to said frame; jaw means mounted upon each arm near the pivoted end thereof and positionable to confront an end portion of the frame to clamp one of said extension cords against the confronting end portion of said frame; and means on the free end of said arms for releasably securing the same in a position wherein the jaw means are engaged with the extension cords.

14. A clamp for retaining the electrical connector of a pair of extension cords in assembled relation, comprising: an elongated frame having an upwardly bowed central portion for receiving said electrical connector and having end portions each adapted to be engaged with a different one of said extension cords; each of said end portions having a transversely extending bearing; a pair of resilient arms, each having a transversely extending shaft portion at one end thereof rotatably received in a different one of said bearings, whereby said arms are free to pivot in a plane lying generally parallel to said frame, each of said arms having a coiled portion at one end of its shaft portion providing an abutment adjacent one edge of said frame, a portion adjacent said shaft portion disposed generally parallel thereto and extending transversely beneath said frame, a clamping element mounted upon each of said transverse portions, each of said arms further including an angularly disposed portion extending from said transverse portion and merging into a lever arm disposed generally parallel with a side edge of said frame, each of said lever arms including a reversely bent portion and a locking end portion disposed in a plane parallel with the lever arm but disposed closer to the side of said frame, said locking end portion being located in the zone of the transverse portion of the other arm and being adapted to be moved to a position inwardly of the coiled portion of the other arm to retain the locking end portion in place.

15. A clamp for retaining a plug and socket type electrical connector associated with a pair of extension cords in assembled relation, comprising: an elongated frame having end portions each adapted to be engaged with a different one of said extension cords; a pair of resilient arms, each pivotally attached at one end thereof to one of said end portions so that said arms are free to pivot in a plane lying generally parallel to the longitudinal sides of said frame, each of said arms having a portion adjacent said one end thereof extending transversely beneath said frame; a clamping element mounted upon each of said transverse portions, and confronting a portion of the lower side of said frame when said arms are in a closed position clamping an extension cord against said frame, each of said arms further including a lever arm portion extending from said transverse portion, said lever arm portions lying on opposite sides of said frame and each extending generally parallel with the side edge of said frame nearest thereto, each of said lever arm portions terminating in an end portion; and means engageable by said end portions when their associated resilient arms have been pivoted to their closed position for locking said arms in said closed position.

16. A clamp as recited in claim 15, wherein each of said frame end portions has a transverse bearing at the outer end thereof, and wherein each of said resilient arms has a transversely extending shaft portion at said one end thereof, said transversely extending shaft portions being rotatably received in said transverse bearings to thereby pivotally attach said arms to said frame end portions.

17. A clamp as recited in claim 15, wherein said elongated frame includes an upwardly bowed central portion for receiving said electrical connector.

18. A clamp as recited in claim 15, wherein the means engageable by the free end portions of the arms comprises an abutment-defining portion at the pivoted end of each of said arms, the free end portion of each arm being engageable behind the abutment-defining portion of the other arm for locking said arms in said closed position.

19. A clamp as defined in claim 13, wherein the base, legs and ends of the frame have a transversely bowed, central reinforcing rib extending longitudinally thereof.

References Cited by the Examiner
UNITED STATES PATENTS

| | | | |
|---|---|---|---|
| 1,233,366 | 7/1917 | Keator | 24—134 |
| 1,411,263 | 4/1922 | Bellis | 339—274 X |
| 2,027,220 | 1/1936 | Benson | 339—260 X |
| 2,338,554 | 1/1944 | Taylor | 339—103 X |
| 2,406,567 | 8/1946 | Schueneman | 339—75 X |
| 2,432,435 | 12/1947 | Millette | 339—91 X |
| 2,575,601 | 11/1951 | Staver | 339—75 |
| 2,709,246 | 5/1955 | Abbott | 339—105 X |

FOREIGN PATENTS

| | | |
|---|---|---|
| 84,392 | 2/1958 | Denmark. |
| 432,272 | 8/1926 | Germany. |

ALBERT H. KAMPE, *Primary Examiner.*

JOSEPH D. SEERS, *Examiner.*